US011501398B2

(12) United States Patent
Pauna

(10) Patent No.: US 11,501,398 B2
(45) Date of Patent: Nov. 15, 2022

(54) INTERCEPTION OF MOBILE APPARATUS

(71) Applicant: EXFO Oy, Oulu (FI)

(72) Inventor: Janne Pauna, Oulu (FI)

(73) Assignee: EXFO OY, Oulu (FI)

( * ) Notice: Subject to any disclaimer, the term of this patent is extended or adjusted under 35 U.S.C. 154(b) by 397 days.

(21) Appl. No.: 16/799,257

(22) Filed: Feb. 24, 2020

(65) Prior Publication Data
US 2020/0273129 A1 Aug. 27, 2020

(30) Foreign Application Priority Data

Feb. 25, 2019 (EP) ...................................... 19159063

(51) Int. Cl.
| G06Q 50/26 | (2012.01) |
| H04W 4/029 | (2018.01) |
| G01C 21/20 | (2006.01) |
| G01S 5/02 | (2010.01) |
| H04M 3/22 | (2006.01) |
| H04W 16/28 | (2009.01) |
| H04W 24/10 | (2009.01) |

(52) U.S. Cl.
CPC ........... *G06Q 50/265* (2013.01); *G01C 21/20* (2013.01); *G01S 5/0273* (2013.01); *H04M 3/2281* (2013.01); *H04W 4/029* (2018.02); *H04W 16/28* (2013.01); *H04W 24/10* (2013.01)

(58) Field of Classification Search
None
See application file for complete search history.

(56) References Cited

U.S. PATENT DOCUMENTS

| 7,035,651 | B2 | 4/2006 | Schreiner et al. |
| 9,872,141 | B2 * | 1/2018 | Tanasa ................. H04W 4/023 |
| 10,034,126 | B2 | 7/2018 | Glasberg et al. |
| 2014/0302869 | A1 | 10/2014 | Rosenbaum et al. |
| 2016/0195603 | A1 | 7/2016 | Li |
| 2016/0295366 | A1 | 10/2016 | Priyanto et al. |
| 2021/0234591 | A1 * | 7/2021 | Eleftheriadis ..... H04W 52/0206 |

FOREIGN PATENT DOCUMENTS

EP        1199903 B1        6/2005

OTHER PUBLICATIONS

Search Report issued in corresponding European Patent Application No. EP19159063, 2 pages (dated Sep. 11, 2019).

* cited by examiner

*Primary Examiner* — Anh Ngoc M Nguyen
(74) *Attorney, Agent, or Firm* — Buchanan Ingersoll & Rooney PC

(57) ABSTRACT

A method and system for intercepting mobile apparatus of cellular radio system are disclosed. The method can include implementing, with an interrogation apparatus, a silent call with a mobile apparatus in a radio cell; implementing, with a mobile platform, at least three transmit radio beams each with a distinct transmission direction in relation to the mobile platform; receiving a measurement report from the mobile apparatus including received downlink power levels of the radio cell and at least one of the three transmit radio beams; receiving a geographical location of the mobile platform; obtaining a geographical orientation of the mobile platform; and calculating a geographical location of the mobile apparatus based on the received downlink power levels, the geographical location of the mobile platform, the distinct transmission directions, and the geographical orientation of the mobile platform.

20 Claims, 4 Drawing Sheets

INTERCEPTION OF MOBILE APPARATUS

FIELD

Various example embodiments relate to a system and a method for intercepting a mobile apparatus of a cellular radio system.

BACKGROUND

A lawful interception of a mobile apparatus by the authorities is sometimes necessary. U.S. Pat. No. 7,035,651 B2, U.S. Pat. No. 9,872,141 B2 and U.S. Ser. No. 10/034, 126 B2 disclose such direction finding, intercepting, and locating. Due to its nature, intercepting a geographical location of the mobile apparatus may be difficult. Consequently, there is a need to provide further sophistication to the interception.

BRIEF DESCRIPTION

According to an aspect, there is provided subject matter of independent claims. Dependent claims define some example embodiments.

One or more examples of implementations are set forth in more detail in the accompanying drawings and the description of embodiments.

LIST OF DRAWINGS

Some example embodiments will now be described with reference to the accompanying drawings, in which FIG. 1 and FIG. 2 illustrate example embodiments of a system;

DESCRIPTION OF EMBODIMENTS

The following embodiments are only examples. Although the specification may refer to "an" embodiment in several locations, this does not necessarily mean that each such reference is to the same embodiment(s), or that the feature only applies to a single embodiment. Single features of different embodiments may also be combined to provide other embodiments. Furthermore, words "comprising" and "including" should be understood as not limiting the described embodiments to consist of only those features that have been mentioned and such embodiments may contain also features/structures that have not been specifically mentioned.

Reference numbers, both in the description of the example embodiments and in the claims, serve to illustrate the example embodiments with reference to the drawings, without limiting it to these examples only.

Figure 1:
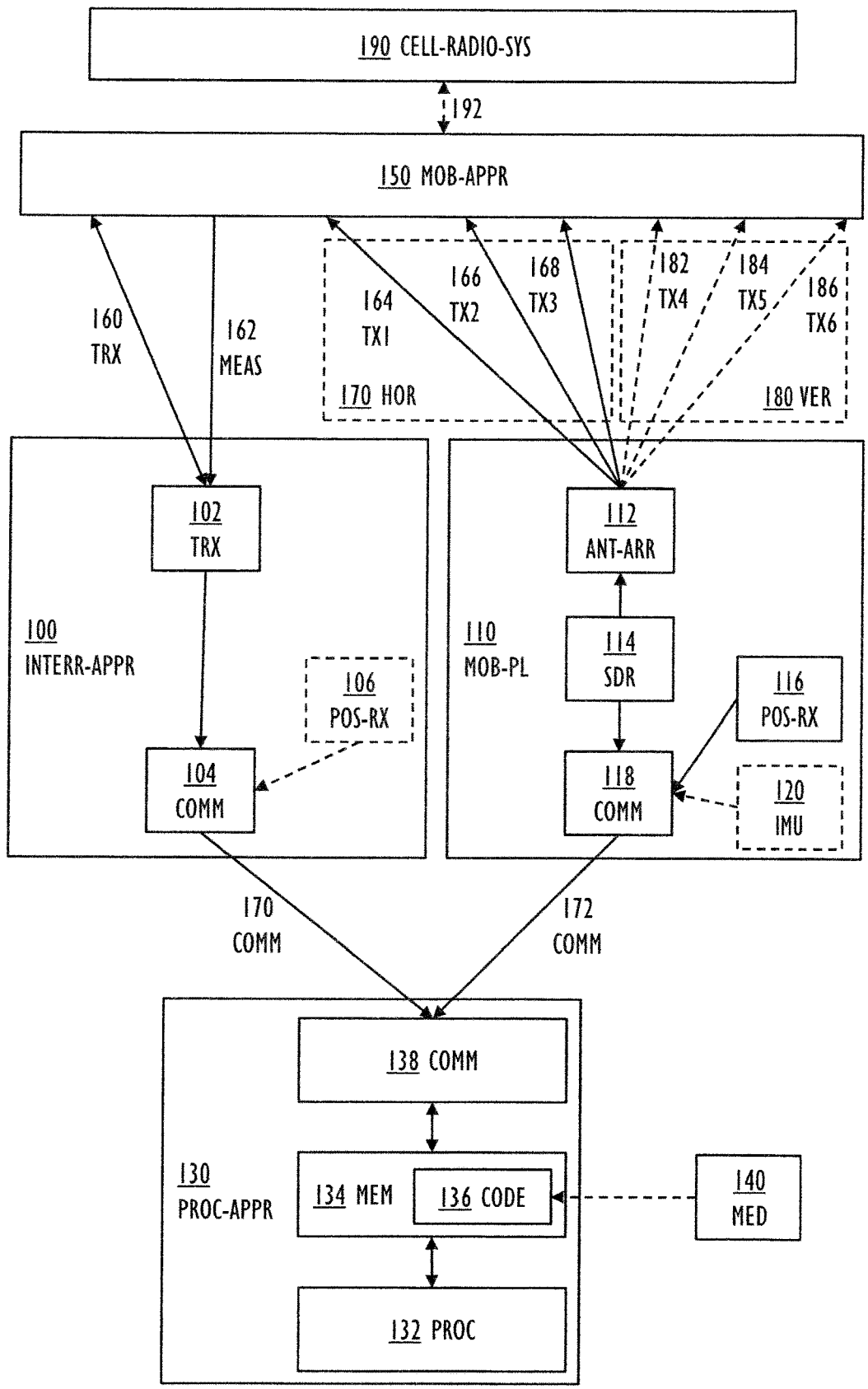
Figure 4:
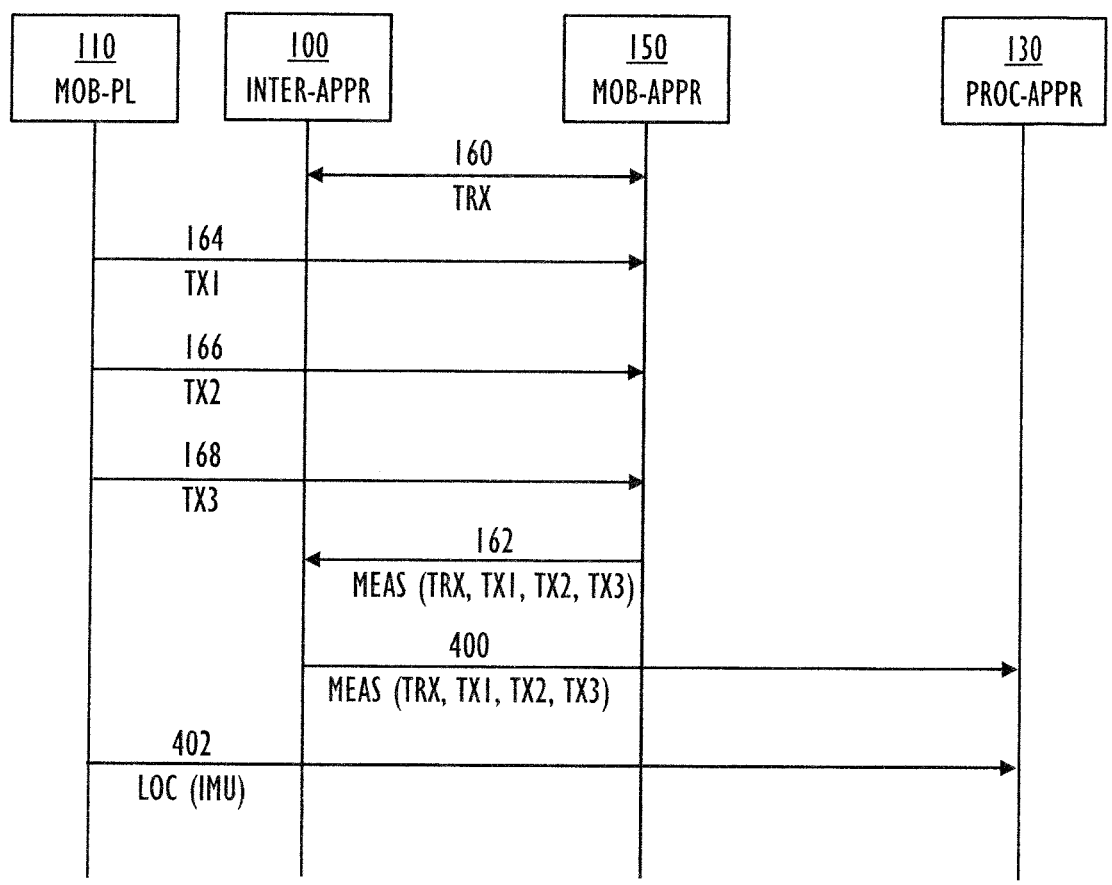
FIG. 4 is a signal sequence chart illustrating example embodiments of communication within the system.
Figure 6:
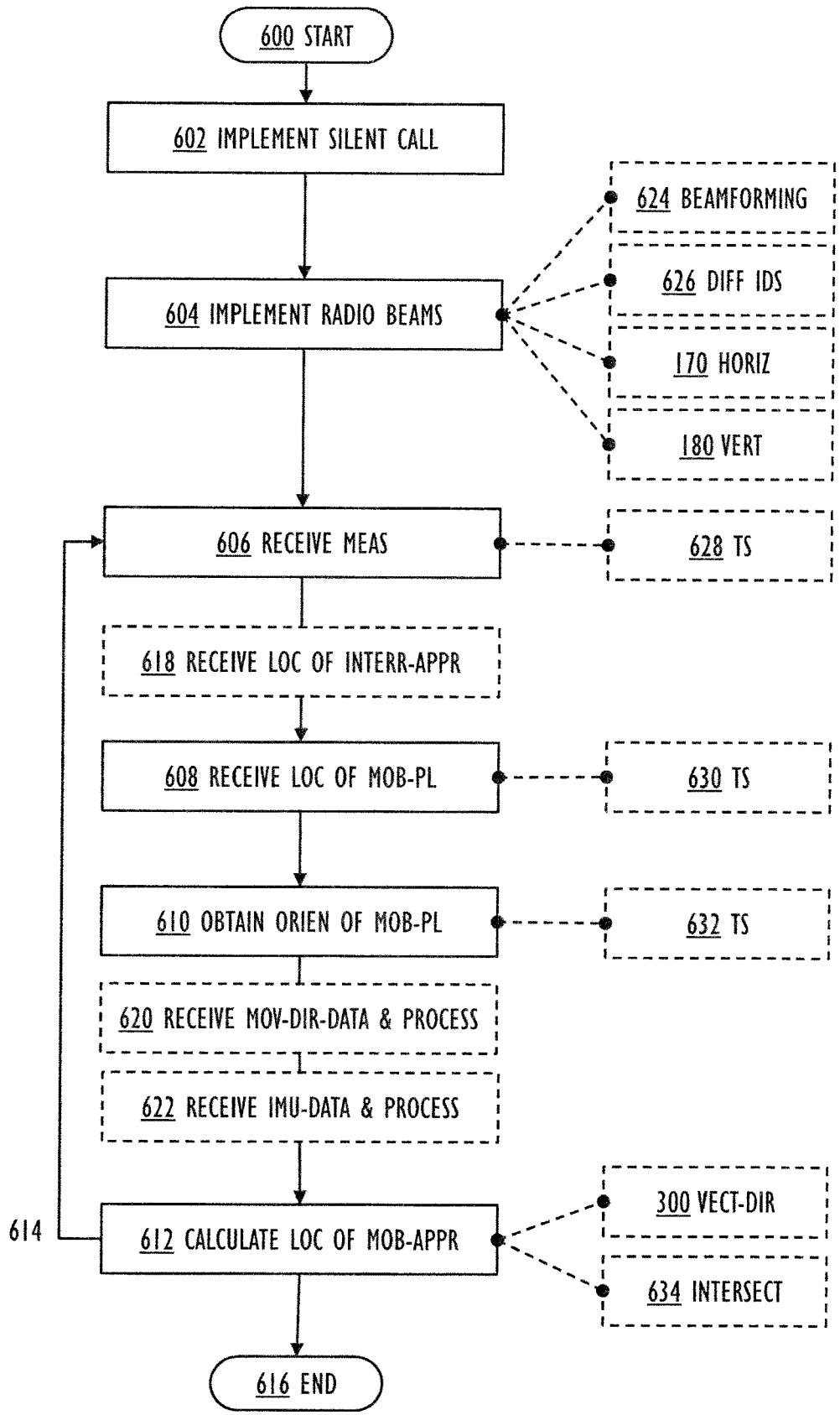
FIG. 6 illustrates example embodiments of a method.

Let us study simultaneously FIG. 1, which illustrates example embodiments of a system for intercepting the mobile apparatus, FIG. 6, which illustrates example embodiments of a method performed by the system, and FIG. 4, which is a signal sequence chart illustrating example embodiments of communication within the system.

The system is configured to intercept a mobile apparatus 150 of a cellular radio system 190. The mobile apparatus 150 may be a portable/vehicle-mounted user subscriber apparatus (with a subscription to the wireless service implemented by a physical subscriber identity module SIM card, or an embedded SIM eSIM, for example). The mobile apparatus includes, but is not limited to a mobile phone, a smart phone, a smartwatch, or any other type of a portable ICT (Information and communication technology) user apparatus (such as a portable computer, a tablet computer, a connected Internet of Things (IoT) device, etc.).

The mobile apparatus 150 comprises a cellular radio transceiver configured to communicate with the cellular radio network 190 such as a mobile phone system. The cellular radio network 190 includes but is not limited to a suitable cellular communication technology such as GSM, GPRS, EGPRS, WCDMA, UMTS, 3GPP, IMT, LTE, LTE-A, NR, 3G, 4G, 5G etc.

The system comprises three actors:
- an interrogation apparatus 100 comprising a radio transceiver 102;
- a mobile platform 110 comprising a software-defined radio 114, an antenna array 112, and a positioning receiver 116 of the mobile platform; and
- a processing apparatus 130, which is communicatively coupled 170, 172 with the interrogation apparatus 100 and the mobile platform 110.

In an example embodiment, the system is configured to intercept the mobile apparatus 150 as a part of a lawful interception, but the system is external in relation to the cellular radio system 190. In this way, the authorities may perform the lawful interception without any co-operation with the operator of the cellular radio network 190. The lawful interception may be performed for a hostile or non-cooperative mobile apparatus 150. The mobile apparatus 150 is a commercial general-purpose off-the-shelf device, as opposed to a purpose-build proprietary equipment, i.e., the mobile apparatus 150 does not require any special hardware or software for the lawful interception. This is because the mobile apparatus 150 only needs to perform normal, standard neighbour cell measurement and reporting.

In an example embodiment, the system is configured to intercept the mobile apparatus 150 during an emergency call, and the system is a part of the cellular radio system 190. In this way, the system may at least partly be embedded in the cellular radio system 190.

The interrogation apparatus 100 may also be called a false base station. 'False' refers to the fact that the false base station 100 is not a part of the (real) cellular radio network 190 and it does not provide continuous service for the mobile (subscriber) apparatuses 150 and their users. The purpose of the false base station 100 is to perform radio interface functions required for implementing a silent call with the mobile apparatus 150. In the silent call, the false base station 100 may page the mobile apparatus 150 to establish communication. FIG. 1 also illustrates that the mobile apparatus 150 is interoperable with the real cellular radio network 190, i.e., the mobile apparatus 150 could gain service 192 from the real cellular radio network 190 (but the false base station 100 overrides this, at least momentarily, so that the silent call 160 may be implemented). The silent call may be implemented as described in EP 1199903 B1, which is incorporated herein by reference, and which describes a method for the activation of a mobile telephone in a public, cellular mobile-telephone network without notifying the user. In order to establish a connection from the interrogation apparatus 100 to the mobile apparatus 150, the known subscriber identification (IMSI) of the mobile apparatus 150 is initially transmitted by the interrogation apparatus 100, and the identification parameters (IMSI, IMEI) of the mobile apparatus 100 are then requested. In order to achieve an activation without notifying the user, the transmission of the setup signal is blocked after the identification parameters (IMSI, IMEI) have been received in the interrogation apparatus 100. However, in the present embodiments, the connection is sustained as long as possible.

The positioning receiver 116 may be a GNSS (Global Navigation Satellite System) receiver, which generates positioning data based on signals received from Earth-orbiting satellites. The GNSS may be GPS (Global Positioning System), Galileo, GLONASS, etc. The positioning receiver 116 may also operate according to another positioning technique, such as a radio network-based positioning (using the so-called triangulation, for example).

The interrogation apparatus 100 and the mobile platform 110 may be separate, distinct apparatuses. The processing apparatus 130 may also be an apparatus that is separate and distinct from the interrogation apparatus 100 and the mobile platform. However, depending on the system design, the processing apparatus 130 may partly or wholly be a part of the other actor, such as being a part of the interrogation apparatus 100. It is even feasible that the interrogation apparatus 100 and the mobile platform 110 may be integrated into a combined apparatus.

The processing apparatus 130 may comprise one or more processors 132 and one or more memories 134 including computer program code 136, wherein the one or more memories 134 and the computer program code 136 are configured to, with the one or more processors 132, cause the performance of the processing apparatus 130.

The processing apparatus 130 may be implemented wholly or partly as a networked server apparatus. The interrogation apparatus 100, the mobile platform 110, and the networked server apparatus 130 may operate according to a client-server architecture, a cloud computing architecture, a peer-to-peer system, or another applicable computing architecture.

In order to communicate, the actors 100, 110, 130 each comprise a communication interface 104, 118, 138 implemented with appropriate wired/wireless communication technologies and standard/proprietary protocols.

The term 'processor' 132 refers to a device that is capable of processing data. Depending on the processing power needed, the processing apparatus 130 may comprise several processors 132 such as parallel processors or a multicore processor.

A non-exhaustive list of implementation techniques for the processor 132 and the memory 134 includes, but is not limited to: logic components, standard integrated circuits, application-specific integrated circuits (ASIC), system-on-a-chip (SoC), application-specific standard products (ASSP), microprocessors, microcontrollers, digital signal processors, special-purpose computer chips, field-programmable gate arrays (FPGA), and other suitable electronics structures.

The term 'memory' 134 refers to a device that is capable of storing data run-time (=working memory) or permanently (=non-volatile memory). The working memory and the non-volatile memory may be implemented by a random-access memory (RAM), dynamic RAM (DRAM), static RAM (SRAM), a flash memory, a solid state disk (SSD), PROM (programmable read-only memory), a suitable semiconductor, or any other means of implementing an electrical computer memory.

The computer program code 136 may be implemented by software. In an example embodiment, the software may be written by a suitable programming language, and the resulting executable code 136 may be stored in the memory 134 and run by the processor 132.

In an example embodiment of FIG. 1, a computer-readable medium 140 comprises the computer program code 136, which, when loaded into the one or more processors 132 and executed by the one or more processors 132, causes the processing apparatus 130 to perform a part of the method.

In an example embodiment, the computer program code 136 may be in source code form, object code form, executable file, or in some intermediate form, for example. The computer-readable medium 140, may comprise at least the following: any entity or device capable of carrying computer program code 136 to the processing apparatus 130, a record medium, a computer memory, a read-only memory, an electrical carrier signal, a telecommunications signal, and a software distribution medium. In some jurisdictions, depending on the legislation and the patent practice, the computer-readable medium 140 may not be the telecommunications signal. In an example embodiment, the computer-readable medium 140 may be a non-transitory computer-readable storage medium.

In the mobile platform 110, one or more radio transceivers may be implemented with the software-defined radio (SDR) 114. Using the SDR 114, the one or more radio transceivers contain the required radio frequency parts (for example: the antenna array 112, a low-noise amplifier, band-pass filters, an analog-to-digital converter), but at least some of the traditional hardware components, especially those used for digital signal processing, are implemented with radio interface software running on one or more processing units of the SDR 114.

The system comprising the three actors 100, 110, 130 is configured to cause the system to perform the method.

The method starts in 602, and ends in 616.

The operations are not strictly in chronological order in FIG. 6, and some of the operations may be performed simultaneously or in an order differing from the given ones. Other functions may also be executed between the operations or within the operations and other data exchanged between the operations. Some of the operations or part of the operations may also be left out or replaced by a corresponding operation or part of the operation. It should be noted that no special order of operations is required, except where necessary due to the logical requirements for the processing order.

Figure 2:
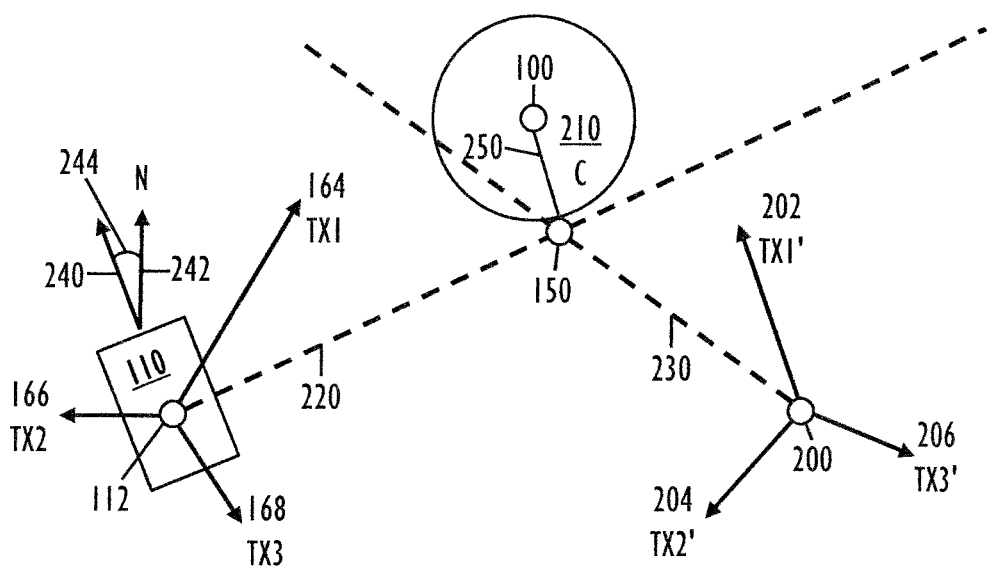

In 602, a silent call 160 with the mobile apparatus 150 in a radio cell 210 is implemented with the radio transceiver 102/the interrogation apparatus 100. As shown in FIG. 2, the radio cell 210 may be an omni cell (implemented by an omnidirectional antenna), but it may also be a sector cell, for example.

In 604, at least three transmit radio beams 164, 166, 168 each with a distinct transmission direction in relation to the mobile platform 110 are implemented with the software-defined radio 114 and the antenna array 112/the mobile platform 110. As shown in FIG. 2, each distinct transmission direction 164, 166, 168 may differ from the adjacent transmission directions by 120 degrees, for example. With such configuration the at least three transmit radio beams 164, 166, 168 are transmitted substantially simultaneously. In this way, the mobile apparatus 150 is capable of performing the neighbour cell measurements of the at least three transmit radio beams 164, 166, 168 while being in a same geographical location, or, if the mobile apparatus 150 is moving, in close successive geographical locations.

In 606, a measurement report 162 is received, with the radio transceiver 102, from the mobile apparatus 150 including received downlink power levels of the radio cell 210 and at least one of the three transmit radio beams 164, 166, 168. The mobile apparatus 150 performs the neighbour cell measurements simultaneously or one after the other. The received downlink power level of the radio cell 210 is the received downlink power level of the serving cell, whereas the received downlink power levels of the three transmit radio beams 164, 166, 168 are the received downlink power levels of the neighbour cells.

In an optional operation 400, the measurement report 162 may be transmitted from the interrogation apparatus 100 to the processing apparatus 130.

In 608/402, a geographical location of the mobile platform 110 is received, by the processing apparatus 130, from the positioning receiver 116 of the mobile platform 110.

In 610, a geographical orientation of the mobile platform 110 is obtained by the processing apparatus 130. As shown in FIG. 2, the geographical orientation may be expressed as an angle 244 between a longitudinal axle 240 of the mobile platform 110 and the compass direction North 242. The geographical orientation of the mobile platform 110 may also be expressed as a heading of the longitudinal axle 240 in degrees (0-360 degrees), for example. The distinct transmission directions are also known (based on the geographical orientation), as the antenna array 112 is fixed in relation to the mobile platform 110.

In an example embodiment, the system is caused to perform:
  receiving 620, by the processing apparatus (130), movement direction data from the positioning receiver 116 of the mobile platform; and
  processing 620, by the processing apparatus 130, the movement direction data to detect the geographical orientation of the mobile platform 110. Such data may be in an NMEA (The National Marine Electronics Association) VTG message as a measured heading in degrees, for example.

In an example embodiment, the mobile platform 110 further comprises an inertial measurement unit (IMU) 120. The inertial measurement unit 120 may comprise one accelerometer, gyroscope, and magnetometer for each of the three-dimensional measurement axes to measure mobile platform's 110 specific force, angular rate, and the magnetic field surrounding the mobile platform 110. The system is caused to perform:
  receiving 622, by the processing apparatus 130, inertial measurement data from the inertial measurement unit 120; and
  processing 622, by the processing apparatus 130, the inertial measurement data to detect the geographical orientation of the mobile platform 110.

In 612, a geographical location of the mobile apparatus 150 is calculated, by the processing apparatus 130, based on the received downlink power levels, the geographical location of the mobile platform 110, the distinct transmission directions, and the geographical orientation of the mobile platform 110.

Figure 3:
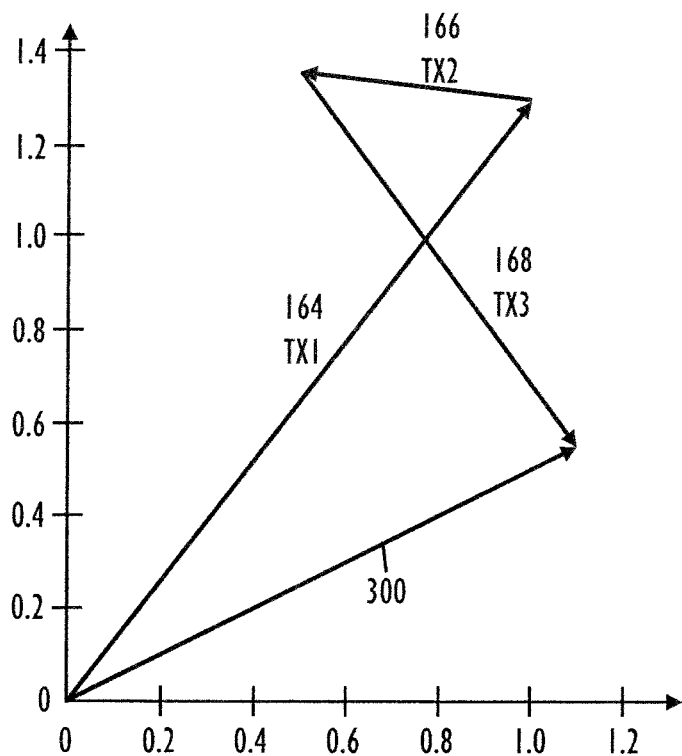
FIG. 3 illustrates an example embodiment of using vectors to calculate a direction of a mobile apparatus.

In an example embodiment illustrated in FIG. 3, the system is caused to calculate, by the processing apparatus 130, the geographical location of the mobile apparatus 150 based on the received downlink power levels, the geographical location of the mobile platform 110, the distinct transmission directions, and the geographical orientation of the mobile platform 110 so that a direction of a vector 300 from the mobile platform 110 to the mobile apparatus 150 is calculated based on the distinct transmission direction and the received downlink power level of each received transmit radio beam 164, 166, 168.

In an example embodiment illustrated with a loop 614 from the operation 612 back to the operation 606, the system is caused to perform:
  receiving 606, with the radio transceiver 102, a subsequent measurement report from the mobile apparatus 150 including subsequent received downlink power levels of the radio cell 210 and at least one of the three transmit radio beams 164, 166, 168;
  receiving 608, by the processing apparatus 130, a subsequent geographical location of the mobile platform 110 from the positioning receiver 116 of the mobile platform;
  obtaining 610, by the processing apparatus 130, a subsequent geographical orientation of the mobile platform 110; and
  calculating 612, by the processing apparatus 130, the geographical location of the mobile apparatus 150 based on the received downlink power levels, the geographical location of the mobile platform 110, the distinct transmission directions, the geographical orientation of the mobile platform 110, the subsequent received downlink power levels, the subsequent geographical location of the mobile platform 110, and the subsequent geographical orientation of the mobile platform 110 so that a further direction of a further vector from the mobile platform 110 to the mobile apparatus 150 is calculated based on the distinct transmission direction and the received downlink power level of each subsequently received transmit radio beam 164, 166, 168, and an intersection point 634 of the vector and the further vector indicates the geographical location of the mobile apparatus 150.

As shown in FIG. 2, the geographical location of the mobile apparatus 150 may be determined by calculating a direction 220 from the mobile platform 110 to the mobile apparatus 150, and, as a distance (based on the timing advance, for example) 250 between the interrogation apparatus 100 and the mobile apparatus 150 is known, the location of the mobile apparatus 150 is determined to be in a crossing of the distance 250 and the direction 220. In order this to work, the geographical location of the interrogation apparatus 100 needs to be known.

In an example embodiment, the interrogation apparatus 100 is mobile and comprises a user portable pack and/or a land vehicle and/or a vessel, and a positioning receiver 106 of the interrogation apparatus configured to determine a geographical location of the interrogation apparatus 100. The system is caused to perform:
  receiving 618, by the processing apparatus, a geographical location of the interrogation apparatus 100 from the positioning receiver 106 of the interrogation apparatus; and
  calculating 612, by the processing apparatus 130, the geographical location of the mobile apparatus 150 based on the received downlink power levels, the geographical location of the mobile platform 110, the distinct transmission directions, the geographical orientation of the mobile platform 110, and the geographical location of the interrogation apparatus 100.

In an example embodiment, the interrogation apparatus 100 is set stationary at a geographical location of the interrogation apparatus 100. The system is caused to calculate 612, by the processing apparatus 130, the geographical location of the mobile apparatus 150 based on the received downlink power levels, the geographical location of the mobile platform 110, the distinct transmission directions, the geographical orientation of the mobile platform 110, and the geographical location of the interrogation apparatus 100.

Figure 5:
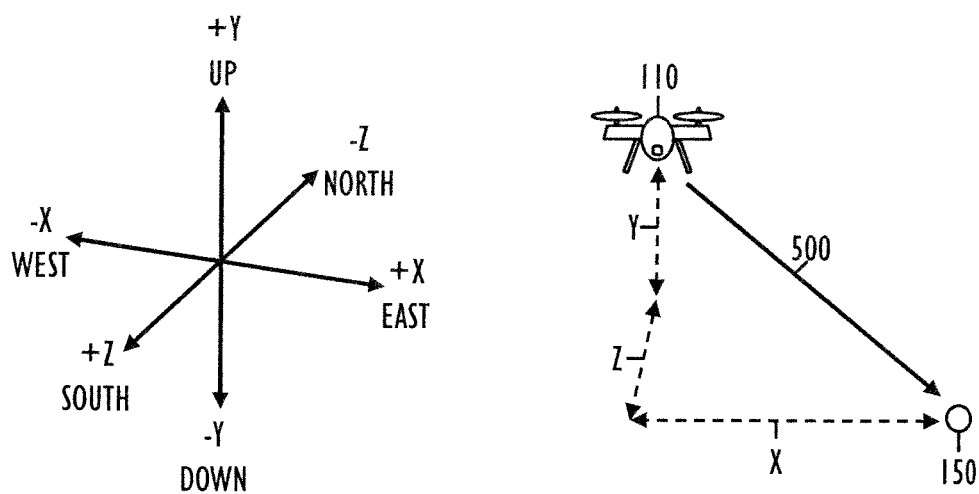
FIG. 5 illustrates further example embodiments of the system.

In an example embodiment, the mobile platform 110 comprises an aerial vehicle and/or a land vehicle and/or a vessel. As shown in FIG. 5, the mobile platform 110 is placed in an unmanned aerial vehicle UAV ("drone"). Note that the term "mobile" means that the platform 110 may move (carried by the vehicle/vessel) from one geographical location to another geographical location, or that the platform 110 may be "moveable", i.e., moved by an authorized person to a specific stationary geographical location.

In an example embodiment, the software-defined radio 114 and the antenna array 112 are configured to make the at least three transmit radio beams 164, 166, 168 directional by beamforming 624. The software-defined radio 114 control the phase and relative amplitude of the signal at each transmitter to create a pattern of constructive and destructive interference, which results in directional signal transmission.

In an example embodiment, the software-defined radio (114) is configured to include a different identifier 626 for each of the at least three transmit radio beams 164, 166, 168. The different identifiers may be cell identifiers or other identifiers used in the cellular radio network 190 and in the measurement report 162.

In an example embodiment, the measurement report, the geographical location of the mobile platform 110, and the geographical orientation of the mobile platform 110 each comprise a time stamp 628, 630, 632 indicating a time of measurement or a time of reception. With the time stamps, the calculations may be made more precise as the various types of data are matched to each other so that they relate to the same moment in time.

Let us study FIG. 1 and FIG. 5 illustrating further example embodiments.

The various transmission directions may be in horizontal directions only along X and Z axes, but also in a vertical direction along Y axis.

In an example embodiment, the system is caused to perform:
  implementing 604, with the software-defined radio 114 and the antenna array 112, the at least three transmit radio beams 164, 166, 168 each with the distinct transmission direction so that the distinct transmission directions are horizontal 170; and
  calculating 612, by the processing apparatus 130, the geographical location of the mobile apparatus 150 as a latitude and a longitude on an electronic map based on the received downlink power levels, the geographical location of the mobile platform 110, the distinct horizontal transmission directions, and the geographical orientation of the mobile platform 110. This example embodiment utilizes the horizontal directions only as in FIG. 2.

In an example embodiment, the system is caused to perform:
  implementing 604, with the software-defined radio 114 and the antenna array 112, at least three further transmit radio beams 182, 184, 186 each with a further distinct transmission direction so that the further distinct transmission directions are vertical 180;
  receiving 606, with the radio transceiver 102, the measurement report 162 from the mobile apparatus 150 including received downlink power levels of the radio cell 210, at least one of the three transmit radio beams 164, 166, 168, and at least one of the three further transmit radio beams 182, 184, 186; and
  calculating 612, by the processing apparatus 130, the geographical location of the mobile apparatus 150 as the latitude, the longitude and the elevation on the electronic map based on the received downlink power levels, the geographical location of the mobile platform 110, the distinct horizontal transmission directions, the further distinct vertical transmission directions, and the geographical orientation of the mobile platform 110. This example embodiment uses besides the horizontal directions also the vertical directions. As show in FIG. 5, the location of the mobile apparatus 150 is indicated by a direction of a three-dimensional vector 500 (by an intersection of two such vectors or by an intersection of such a vector and a distance based on the timing advance in the cell, as explained earlier, or by an intersection of the vector and the Earth's ground plane).

FIG. 2 illustrates another example embodiment, wherein more than one mobile platforms 110, 200 are used. The second mobile platform 200 is configured to transmit three further transmit radio beams 202, 204, 206, and the location of the mobile apparatus 150 may be determined at a crossing of the direction vector 220 from the first mobile platform 110 and a direction vector 230 of the second mobile platform 200. The measurement report 162 from the mobile apparatus 150 may include received downlink power levels of the radio cell 210, at least one of the three transmit radio beams 164, 166, 168, and at least one of the three further transmit radio beams 202, 204, 206. FIG. 2 also illustrates an alternative for this example embodiment using only one mobile platform: if reference sign 110 illustrates a first geographical location of the mobile platform, and reference sign 200 illustrates a second geographical location of the mobile platform, two successive measurement reports include the received downlink power levels of the radio cell 210 and at least one of the three transmit radio beams (first as 164, 166, 168, and subsequently as 202, 204, 206). Note that also a geographical orientation of the mobile platform in each location needs to be taken into account while determining the direction vectors 220, 230.

Even though the invention has been described with reference to one or more example embodiments according to the accompanying drawings, it is clear that the invention is not restricted thereto but can be modified in several ways within the scope of the appended claims. All words and expressions should be interpreted broadly, and they are intended to illustrate, not to restrict, the example embodiments. It will be obvious to a person skilled in the art that, as technology advances, the inventive concept can be implemented in various ways.

The invention claimed is:

1. A system for intercepting a mobile apparatus of a cellular radio system, comprising:
  an interrogation apparatus having a radio transceiver;
  a mobile platform having a software-defined radio, an antenna array, and a positioning receiver of the mobile platform; and
  a processing apparatus, communicatively coupled with the interrogation apparatus and the mobile platform, and configured to cause the system at least to perform:

implementing, with the radio transceiver, a silent call with the mobile apparatus in a radio cell;

implementing, with the software-defined radio and the antenna array, at least three transmit radio beams each with a distinct transmission direction in relation to the mobile platform;

receiving, with the radio transceiver, a measurement report from the mobile apparatus including received downlink power levels of the radio cell and at least one of the three transmit radio beams;

receiving, by the processing apparatus, a geographical location of the mobile platform from the positioning receiver of the mobile platform;

obtaining, by the processing apparatus, a geographical orientation of the mobile platform; and calculating, by the processing apparatus, a geographical location of the mobile apparatus based on the received downlink power levels of the radio cell, the geographical location of the mobile platform, the distinct transmission directions of at least one of the at least three transmit radio beams, and the geographical orientation of the mobile platform.

2. The system of claim 1, wherein the interrogation apparatus is mobile and comprises:

at least one or more of a user portable pack, a land vehicle, or a vessel; and a positioning receiver of the interrogation apparatus configured to determine a geographical location of the interrogation apparatus; wherein the system is configured to perform:

receiving, by the processing apparatus, a geographical location of the interrogation apparatus from the positioning receiver of the interrogation apparatus; and calculating, by the processing apparatus, the geographical location of the mobile apparatus based on the received downlink power levels of the radio cell, the geographical location of the mobile platform, the distinct transmission directions of at least one of the at least three transmit radio beams, the geographical orientation of the mobile platform, and the geographical location of the interrogation apparatus.

3. The system of claim 1, wherein the interrogation apparatus is set stationary at a geographical location of the interrogation apparatus, and wherein the system is configured to perform:

calculating, by the processing apparatus, the geographical location of the mobile apparatus based on received downlink power levels of the radio cell, the geographical location of the mobile platform, the distinct transmission directions of at least one of the at least three transmit radio beams, the geographical orientation of the mobile platform, and the geographical location of the interrogation apparatus.

4. The system of claim 1, wherein the mobile platform comprises:

at least one or more of an aerial vehicle, a land vehicle, or a vessel.

5. The system of claim 1, wherein the software-defined radio and the antenna array are configured to perform beamforming to make the at least three transmit radio beams directional.

6. The system of claim 1, wherein the software-defined radio is configured to include:

a different identifier for each of the at least three transmit radio beams.

7. The system of claim 1, wherein the processing apparatus is configured to recognize within one or more of the measurement report, the geographical location of the mobile platform, or the geographical orientation of the mobile platform, a time stamp indicating a time of measurement or a time of reception.

8. The system of claim 1, wherein the system is configured to perform:

receiving, by the processing apparatus, movement direction data from the positioning receiver of the mobile platform; and processing, by the processing apparatus, the movement direction data to detect the geographical orientation of the mobile platform.

9. The system of claim 1, wherein the mobile platform comprises:

an inertial measurement unit, and wherein the system is configured to perform:

receiving, by the processing apparatus, inertial measurement data from the inertial measurement unit; and processing, by the processing apparatus, the inertial measurement data to detect the geographical orientation of the mobile platform.

10. The system of claim 1, wherein the system is configured to perform:

calculating, by the processing apparatus, the geographical location of a mobile apparatus based on received downlink power levels of the radio cell, the geographical location of the mobile platform, the distinct transmission directions of at least one of the at least three transmit radio beams, and the geographical orientation of the mobile platform so that a direction of a vector from the mobile platform to the mobile apparatus is calculated based on the distinct transmission direction and the received downlink power level of each received transmit radio beam.

11. The system of claim 10, wherein the system is configured to perform:

receiving, with the radio transceiver, a subsequent measurement report from a mobile apparatus including subsequent received downlink power levels of the radio cell and at least one of the three transmit radio beams;

receiving, by the processing apparatus, a subsequent geographical location of the mobile platform from the positioning receiver of the mobile platform;

obtaining, by the processing apparatus, a subsequent geographical orientation of the mobile platform; and calculating, by the processing apparatus, the geographical location of the mobile apparatus based on received downlink power levels of the radio cell, the geographical location of the mobile platform, the distinct transmission directions of at least one of the at least three transmit radio beams, the geographical orientation of the mobile platform, the subsequent received downlink power levels, the subsequent geographical location of the mobile platform, and the subsequent geographical orientation of the mobile platform so that a further direction of a further vector from the mobile platform to the mobile apparatus is calculated based on the distinct transmission direction and the received downlink power level of each subsequently received transmit radio beam, and an intersection point of the vector and the further vector will indicate the geographical location of the mobile apparatus.

12. The system of claim 1, wherein the system is configured to perform:

implementing, with the software-defined radio and the antenna array, the at least three transmit radio beams each with the distinct transmission direction so that the distinct transmission directions are horizontal; and calculating, by the processing apparatus, the geographical location of the mobile apparatus as a latitude and a longitude on an electronic map based on received downlink power levels of the radio cell, the geographical location of the mobile platform, the distinct horizontal transmission directions of at least one of the at least three transmit radio beams, and the geographical orientation of the mobile platform.

13. The system of claim 12, wherein the system is configured to perform:

implementing, with the software-defined radio and the antenna array, at least three further transmit radio beams each with a further distinct transmission direction so that the further distinct transmission directions are vertical;

receiving, with the radio transceiver, the measurement report from the mobile apparatus including received downlink power levels of the radio cell, at least one of the three transmit radio beams, and at least one of the three further transmit radio beams; and calculating, by the processing apparatus, the geographical location of the mobile apparatus as the latitude, the longitude and an elevation on the electronic map based on received downlink power levels of the radio cell, the geographical location of the mobile platform, the distinct horizontal transmission directions of at least one of the at least three transmit radio beams, the further distinct vertical transmission directions, and the geographical orientation of the mobile platform.

14. The system of claim 1, wherein:

the system is configured to intercept the mobile apparatus as a part of a lawful interception, but the system is external in relation to the cellular radio system; or the system is configured to intercept the mobile apparatus during an emergency call, and the system is a part of the cellular radio system.

15. A method for intercepting a mobile apparatus of a cellular radio system, the method comprising:

implementing, with an interrogation apparatus, a silent call with the mobile apparatus in a radio cell;

implementing, with a mobile platform, at least three transmit radio beams each with a distinct transmission direction in relation to the mobile platform;

receiving a measurement report from the mobile apparatus including received downlink power levels of the radio cell and at least one of the three transmit radio beams;

receiving a geographical location of the mobile platform;

obtaining a geographical orientation of the mobile platform; and calculating a geographical location of the mobile apparatus based on the received downlink power levels of the radio cell, the geographical location of the mobile platform, the distinct transmission directions of at least one of the at least three transmit radio beams, and the geographical orientation of the mobile platform.

16. The method of claim 15, wherein the interrogation apparatus is mobile and includes at least one or more of a user portable pack, a land vehicle or a vessel, and a positioning receiver of the interrogation apparatus to determine a geographical location of the interrogation apparatus, and wherein the method comprises:

receiving a geographical location of the interrogation apparatus from the positioning receiver of the interrogation apparatus; and calculating the geographical location of the mobile apparatus based on the received downlink power levels of the radio cell, the geographical location of the mobile platform, the distinct transmission directions of at least one of the at least three transmit radio beams, the geographical orientation of the mobile platform, and the geographical location of the interrogation apparatus.

17. The method of claim 15, wherein the mobile platform includes at least one or more of an aerial vehicle, a land vehicle, or a vessel.

18. The method of claim 15, wherein the mobile platform includes a different identifier for each of the at least three transmit radio beams.

19. The method of claim 15, comprising:

calculating the geographical location of the mobile apparatus based on the received downlink power levels of the radio cell, the geographical location of the mobile platform, the distinct transmission directions of at least one of the at least three transmit radio beams, and the geographical orientation of the mobile platform; and calculating a direction of a vector from the mobile platform to the mobile apparatus based on the distinct transmission direction and the received downlink power level of each received transmit radio beam.

20. The method of claim 19, comprising:

receiving, with the interrogation apparatus, a subsequent measurement report from the mobile apparatus including subsequent received downlink power levels of the radio cell and at least one of the three transmit radio beams;

receiving a subsequent geographical location of the mobile platform from the positioning receiver of the mobile platform;

obtaining a subsequent geographical orientation of the mobile platform;

calculating the geographical location of the mobile apparatus based on the received downlink power levels of the radio cell, the geographical location of the mobile platform, the distinct transmission directions of at least one of the at least three transmit radio beams, the geographical orientation of the mobile platform, the subsequent received downlink power levels, the subsequent geographical location of the mobile platform, and the subsequent geographical orientation of the mobile platform; and calculating a further direction of a further vector from the mobile platform to the mobile apparatus is calculated based on the distinct transmission direction and the received downlink power level of each subsequently received transmit radio beam, an intersection point of the vector and the further vector indicating the geographical location of the mobile apparatus.

* * * * *